(12) United States Patent
Wille et al.

(10) Patent No.: US 12,578,248 B2
(45) Date of Patent: Mar. 17, 2026

(54) DISPLAY DEVICE WITH INTEGRATED DEFECT DETECTION FOR LOUVERED BLIND LAMELLAE

(71) Applicant: Continental Automotive Technologies GmbH, Hannover (DE)

(72) Inventors: Felicitas Wille, Darmstadt (DE); Oliver Müller, Pfungstadt (DE); Michael Döbler, Seligenstadt (DE); Bjoern Hebestreit, Aschaffenburg (DE)

(73) Assignee: Continental Automotive Technologies GmbH, Hannover (DE)

( * ) Notice: Subject to any disclaimer, the term of this patent is extended or adjusted under 35 U.S.C. 154(b) by 279 days.

(21) Appl. No.: 18/549,880

(22) PCT Filed: Mar. 2, 2022

(86) PCT No.: PCT/DE2022/200031
§ 371 (c)(1),
(2) Date: Sep. 8, 2023

(87) PCT Pub. No.: WO2022/188930
PCT Pub. Date: Sep. 15, 2022

(65) Prior Publication Data
US 2024/0167913 A1 May 23, 2024

(30) Foreign Application Priority Data

Mar. 10, 2021 (DE) .................... 10 2021 202 346.0

(51) Int. Cl.
*G01M 11/02* (2006.01)
*G02B 27/00* (2006.01)
(52) U.S. Cl.
CPC ..... *G01M 11/0207* (2013.01); *G02B 27/0081* (2013.01); *G02B 2207/123* (2013.01)

(58) Field of Classification Search
CPC ........... G01M 11/0207; G02B 27/0081; G02B 2207/123; G02B 2027/0118; G02B 27/0018
See application file for complete search history.

(56) References Cited

U.S. PATENT DOCUMENTS

| | | | |
|---|---|---|---|
| 2012/0224062 A1 | 9/2012 | Lacoste | |
| 2014/0268292 A1* | 9/2014 | Wang | G02B 26/00 359/290 |

(Continued)

FOREIGN PATENT DOCUMENTS

| | | |
|---|---|---|
| DE | 102015224939 A1 | 6/2017 |
| DE | 102017219069 A1 | 4/2019 |

(Continued)

OTHER PUBLICATIONS

German Office Action dated Dec. 14, 2021 for the counterpart German Patent Application 10 2021 202 346.0 which this application claims priority.

(Continued)

*Primary Examiner* — Georgia Y Epps
*Assistant Examiner* — Monica T Taba
(74) *Attorney, Agent, or Firm* — Buchanan Ingersoll & Rooney PC

(57) ABSTRACT

An apparatus for generating a virtual image including a display element for generating an image, an optical waveguide for expanding an exit pupil, and an antiglare element, which is arranged after the optical waveguide in the beam path and is configured as a shutter comprising slats, wherein the slats are braced in pre-tensioning equipment outside of a visible region of the apparatus, and rest against a contacting element under pretension.

12 Claims, 12 Drawing Sheets

(56)          References Cited

U.S. PATENT DOCUMENTS

| | | |
|---|---|---|
| 2016/0124223 A1 | 5/2016 | Shinbo |
| 2018/0081167 A1 | 3/2018 | Gamet |

FOREIGN PATENT DOCUMENTS

| | | |
|---|---|---|
| DE | 102018213061 A1 | 1/2020 |
| DE | 112018003725 T5 | 4/2020 |
| DE | 10 2021 207 977 B3 | 12/2022 |
| JP | H0921278 A | 1/1997 |
| JP | 2006323567 A | 11/2006 |
| JP | 2017165163 A | 9/2017 |
| WO | 2007048161 A1 | 5/2007 |

OTHER PUBLICATIONS

The International Search Report and the Written Opinion of the International Searching Authority mailed Jun. 13, 2022 for the counterpart PCT Application No. PCT/DE2022/000031.
Intention of Grant (Notification pursuant to Rule 71(3) EPC) issued Oct. 16, 2025, by the European Patent Office in corresponding European Patent Application No. 22 711 478.2-1001 and an English machine translation of the Intention of Grant. (92 pages).

* cited by examiner

DISPLAY DEVICE WITH INTEGRATED DEFECT DETECTION FOR LOUVERED BLIND LAMELLAE

The present application is a National Stage Application under 35 U.S.C. § 371 of International Patent Application No. PCT/DE20221200031 filed on Mar. 2, 2022, and claims priority from German Patent Application No. 10 2021 202 346.0 filed on Mar. 10, 2021, in the German Patent and Trade Mark Office, the disclosures of which are herein incorporated by reference in their entireties.

BACKGROUND

1. Field

Embodiments of the present application relate to defect detection for antireflection slats of a display device having a picture generating unit with a display element for displaying an image and an optical unit for projecting the image onto a projection surface.

2. Description of Related Art

Such display devices may, for example, be used for a head-up display for a means of transportation. A head-up display, also referred to as a HUD, is intended to mean a display system in which the viewer can maintain their viewing direction since the contents to be represented are superimposed on their visual field. While such systems were originally used primarily in the aeronautical sector due to their complexity and costs, they are now also being used in large-scale production in the automotive sector.

Head-up displays generally consist of an image generator, an optical unit, and a mirror unit. The image generator generates the image. The optical unit directs the image onto the mirror unit. The image generator is often also referred to as a picture generating unit or PGU. The mirror unit is a partially reflecting, light-transmissive pane. The viewer thus sees the contents represented by the image generator as a virtual image and at the same time sees the real world behind the pane. In the automotive sector, the windshield is often used as mirror unit, and its curved shape must be taken into account in the representation. Due to the interaction of the optical unit and the mirror unit, the virtual image is an enlarged representation of the image generated by the image generator.

The viewer can see the virtual image only from the position of the so-called eyebox. The eyebox refers to a region, the height and width of which correspond to a theoretical viewing window. As long as one of the viewers eyes is within the eyebox, all elements of the virtual image are visible to that eye. If, on the other hand, the eye is outside the eyebox, the virtual image is visible only partially or not at all to the viewer. The larger the eyebox is, the less restricted the viewer is in choosing their seating position.

The size of the eyebox of conventional head-up displays is limited by the size of the optical unit. One approach for enlarging the eyebox is to couple the light coming from the picture generating unit into an optical waveguide. The light that is coupled into the optical waveguide undergoes total internal reflection at the interfaces of the latter and is thus guided within the optical waveguide. In addition, a portion of the light is coupled out at a multiplicity of positions along the propagation direction. Owing to the optical waveguide, expansion of the exit pupil is achieved in this way. The effective exit pupil is composed here of images of the aperture of the image generation system.

Against this background, US 2016/0124223 A1 describes a display device for virtual images. The display device comprises an optical waveguide that causes light that is coming from a picture generating unit and is incident through a first light incidence surface to repeatedly undergo internal reflection in order to move in a first direction away from the first light incidence surface. The optical waveguide also has the effect that a portion of the light guided in the optical waveguide exits to the outside through regions of a first light exit surface that extends in the first direction. The display device further comprises a first light-incidence-side diffraction grating that diffracts incident light to cause the diffracted light to enter the optical waveguide, and a first light-emergent diffraction grating that diffracts the light that is incident from the optical waveguide. US 2012/0224062 A1 also relates to a display device for virtual images, having an optical waveguide.

In the currently known design of such an apparatus, in which the optical waveguide consists of glass plates within which diffraction gratings or holograms are arranged, a problem arises if light is incident from outside. Stray light may enter the user's eye due to reflections of the light that is incident from outside. The contrast of the virtual image perceived by the user is furthermore reduced.

In conventional apparatuses, reflective components may therefore be tilted and combined with glare traps so that reflections do not reach the region in which the driver's eye is expected to be. Alternatively, antireflection coatings are employed and structural roughness is used in order to reduce the reflection intensity.

Tilting the components takes up significant installation space, which is limited in automobiles. Furthermore, the performance of the components is generally reduced with tilted installation. Layers and structures lessen the achievable intensity, but the reflections generally remain clearly visible and significantly reduce the contrast.

DE 10 2018 213 061 A1 discloses a device for generating a virtual image, having a display element for generating an image, an optical waveguide for expanding an exit pupil and an antiglare element, which is arranged after the optical waveguide in the beam path and is configured as a shutter comprising slats. JP 2017-165 163 A discloses a head-up display in which slats that are fixed during operation are likewise used.

Aspects and objects of embodiments of the present application relate to an improved apparatus for generating a virtual image, with which the influence of stray light is reduced.

SUMMARY

A device according to the embodiment for generating a virtual images includes a display element for generating an image, an optical waveguide for expanding an exit pupil, and an antiglare element which is arranged after the optical waveguide in the beam path and is configured as a shutter comprising slats, in which the slats are braced in pretensioning equipment outside of a visible region of the apparatus, and rest against a contacting element under pretension. This is advantageous in that a defect detection for a slat is possible via the contacting element. A defective slat, which is partly torn or ripped completely, has no tension and hence loses contact with the contacting element. Lack of contact indicates a defect, while an intact slat is present when the contact exists. Advantageously, the pretensioning equipment and the contacting element are arranged outside of the visible region of the apparatus, preventing an impairment of the beam path, and hence of the virtual image, by these elements.

Advantageously, the contacting element is a spring with an electrically conductive embodiment, which is electrically connected to a stop terminal in a tensioned state or in a rest state and which is electrically separated from the stop terminal in the corresponding other state. In this case, for example, the spring consists of metal or of an electrically insulating or only poorly conducting material, which is provided with an electrically conductive layer or an electrically conductive region. An advantage of this solution consists of the defect detection being implemented not directly by way of the slat but by means of a separate element which is actuated by way of the pretension of the slat. Consequently, the slat requires no special design measures or material choice.

Advantageously, the slat has an electrically conductive embodiment at least in a slat region situated outside of the visible region of the apparatus. This is advantageous in that the slat itself establishes electrical contact, preferably between the pretensioning equipment and the contacting element. In this case, the slat may have an electrically conductive embodiment over its entire length. By way of example, the slat may consist of an electrically conductive material, for example an electrically conductive plastic, a metal film or any other suitable electrically conductive material. However, the slat may also be coated with a correspondingly conductive material. Preferably, the slat has an electrically conductive embodiment only in its part located outside of the visible region of the apparatus. In this case, there are no impairments of the beam path in the visible region which are caused by the electrical conductivity. By way of example, such an impairment might occur if a metallic coating is used, the latter possibly leading to unwanted reflections if situated within the visible region.

Advantageously, the slat has an electrically insulating embodiment on its side facing away from the contacting element. Even if a slat tears off and comes into contact with an adjacently arranged contact element, no electrical contact is established in this case and a spurious signal is avoided.

Advantageously, the pretensioning equipment and the contacting element are arranged offset in a direction perpendicular to the longest extent of a slat. Consequently, the slat is also pretensioned in a direction perpendicular to the pretension caused by the pretensioning equipment. Hence, the contact pressure of the slat on the contacting element is increased, which increases the reliability of the electrical contact and consequently the reliability of the defect detection. Additionally, the pretension exerted by the pretensioning equipment can be designed to be only very small such that only the tension caused by the offset arrangement of pretensioning equipment and contacting element defines the actual pretension, present during operation, in the direction of the longest extent of the slat. In this case, the pretensioning equipment acts as pure holding equipment which itself does not exert any special pretension.

Advantageously, the contacting element is an adjustment mechanism for changing the setting angle of the slats. This is advantageous in that no separate contacting element is required; instead, the function thereof is also adopted by an adjustment mechanism which is often provided in any case. Consequently, the number of components required is reduced.

An apparatus according to the embodiment advantageously comprises an electrical evaluation circuit, by means of which a plurality of slats are jointly monitored. This is advantageous in that it keeps the circuitry outlay small.

Advantageously, the pretensioning equipment and/or the contacting element is provided with an electrically conductive adhesive. In this way, the electrical contact to the slat or to a contacting can be established without much outlay.

BRIEF DESCRIPTION OF THE DRAWINGS

Further features and advantages will be evident from the following description and the appended claims in conjunction with the figures, in which:

DETAILED DESCRIPTION

For a better understanding of the principles of the present application, embodiments of the present application will be explained in more detail below with the aid of the figures. The same references are used in the figures for identical or functionally identical elements and are not necessarily described again for each figure. It is understood that the present application is not limited to the illustrated embodiments and that the described features may also be combined or modified without departing from the scope of protection of the present application as defined in the appended claims.

First, the basic concept of a head-up display with an optical waveguide will be explained with the aid of FIGS. 1 to 4.

Figure 1:
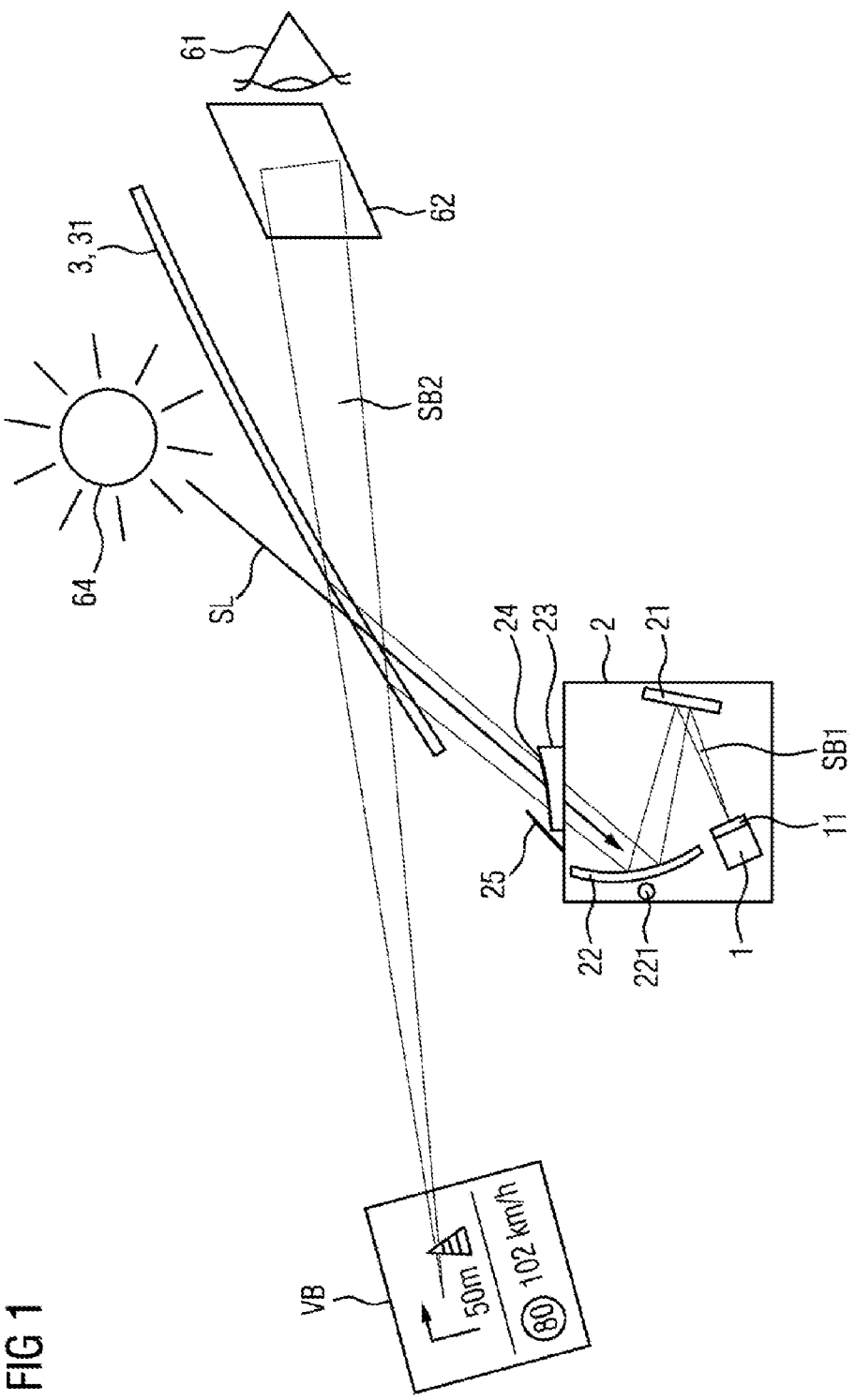
FIG. 1 schematically shows a head-up display according to the prior art for a motor vehicle.

FIG. 1 shows a schematic diagram of a head-up display according to the prior art for a motor vehicle. The head-up display has an image generator 1, an optical unit 2 and a mirror unit 3. A beam of rays SB1 emanates from a display element 11 and is reflected by a folding mirror 21 onto a curved mirror 22, which reflects it in the direction of the mirror unit 3. The mirror unit 3 is represented here as a windshield 31 of a motor vehicle. From there, the beam of rays SB2 travels in the direction of an eye 61 of a viewer.

The viewer sees a virtual image VB that is located outside the motor vehicle, above the engine hood or even in front of the motor vehicle. Due to the interaction between the optical unit 2 and the mirror unit 3, the virtual image VB is an enlarged representation of the image displayed by the display element 11. A speed limit, the current vehicle speed and navigation instructions are symbolically represented here. As long as the eye 61 is within the eyebox 62, which is indicated by a rectangle, all elements of the virtual image are visible to the eye 61. If the eye 61 is outside the eyebox 62, the virtual image VB is visible only partially or not at all to the viewer. The larger the eyebox 62 is, the less restricted the viewer is when choosing their seating position.

The curvature of the curved mirror 22 serves to condition the beam path and thus to ensure a larger image and a larger eyebox 62. In addition, the curvature compensates for a curvature of the windshield 31, with the result that the virtual image VB corresponds to an enlarged reproduction of the image represented by the display element 11. The curved mirror 22 is rotatably mounted by means of a bearing 221. The rotation of the curved mirror 22 that this allows thereby makes it possible to displace the eyebox 62 and thus to adapt the position of the eyebox 62 to the position of the eye 61. The folding mirror 21 serves to ensure that the path traveled by the beam of rays SB1 between the display element 11 and the curved mirror 22 is long and, at the same time, that the optical unit 2 is nevertheless compact. The optical unit 2 is delimited from the environment by a transparent cover 23. The optical elements of the optical unit 2 are thus protected, for example against dust inside the vehicle. Furthermore, there is an optical film 24 or a coating, which is intended to prevent incoming sunlight SL from reaching the display element 11 via the mirrors 21, 22, on the cover 23. Said display element 11 could otherwise be temporarily or permanently damaged by the resulting development of heat. In order to prevent this, an infrared component of the sunlight SL is for example filtered out by means of the optical film 24. Antiglare protection 25 serves to shade light incident from the front, so that it is not reflected by the cover 23 in the direction of the windshield 31, which could cause the viewer to be dazzled. In addition to sunlight SL, the light from another stray light source 64 may also reach the display element 11.

Figure 2:
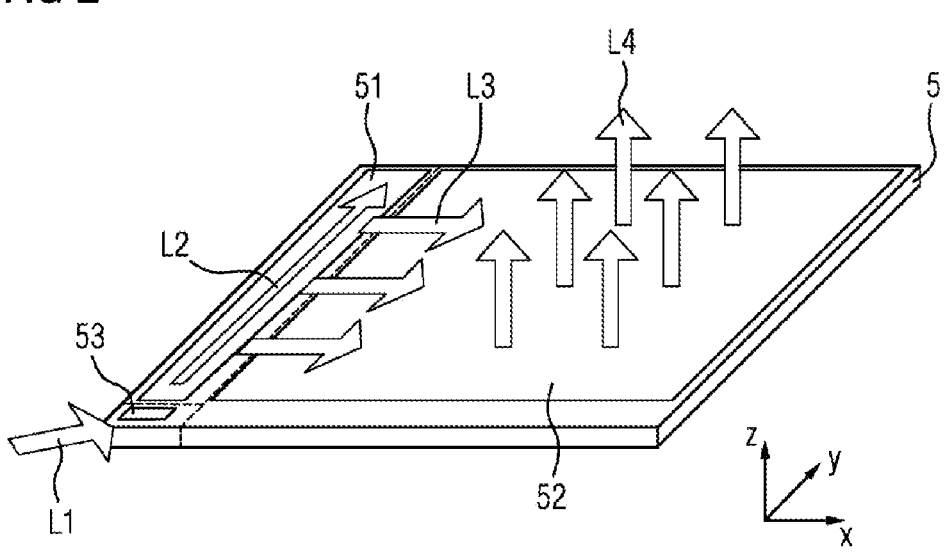
FIG. 2 shows an optical waveguide with two-dimensional enlargement.

FIG. 2 shows a schematic spatial illustration of an optical waveguide 5 with two-dimensional enlargement. The lower left region shows an input coupling hologram 53, by means of which light L1 coming from a picture generating unit (not shown) is coupled into the optical waveguide 5. It propagates therein upward to the right in the drawing, according to the arrow L2. In this region of the optical waveguide 5, there is a folding hologram 51 that acts similarly to many partially transmissive mirrors arranged one behind the other and generates a light beam that is broadened in the Y-direction and propagates in the X-direction. This is indicated by three arrows L3. In the part of the optical waveguide 5 that extends to the right in the figure, there is an output coupling hologram 52 that likewise acts similarly to many partially transmissive mirrors arranged one behind the other and couples out light, indicated by arrows L4, upward in the Z-direction from the optical waveguide 5. In this case, an expansion takes place in the X-direction, so that the original incident light bundle L1 leaves the optical waveguide 5 as a light bundle L4 that is enlarged in two dimensions.

Figure 6:
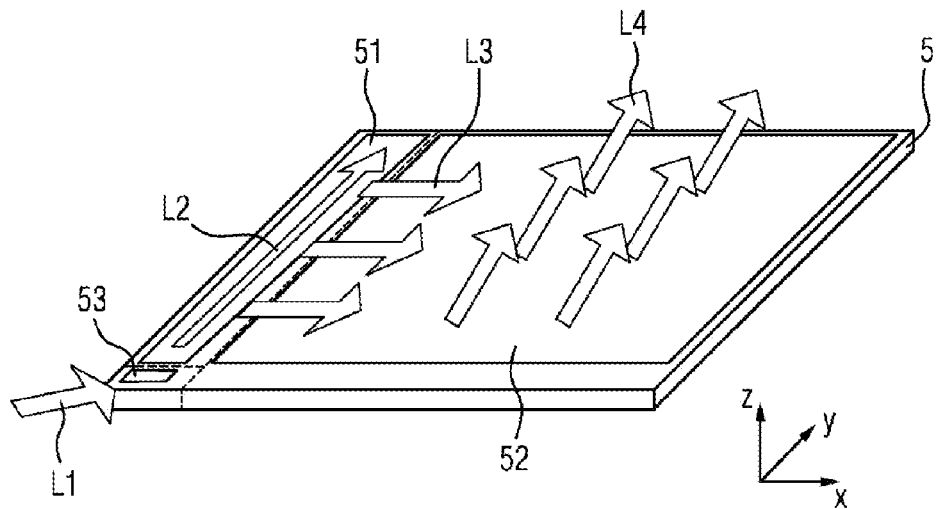
FIG. 6 shows an alternative optical waveguide with two-dimensional enlargement.

FIG. 6 shows a schematic illustration of an optical waveguide with two-dimensional enlargement, which is an alternative to FIG. 2. Here, the output coupling hologram 52 is configured in such a way that it couples light out not perpendicularly to the surface of the optical waveguide 5 but at an angle with respect to the Z-direction, as illustrated by the arrows L4. In this way, the optical waveguide 5 may be arranged according to the available installation space, without having to allow for perpendicular emergence of the light bundle enlarged in two dimensions.

Figure 3:
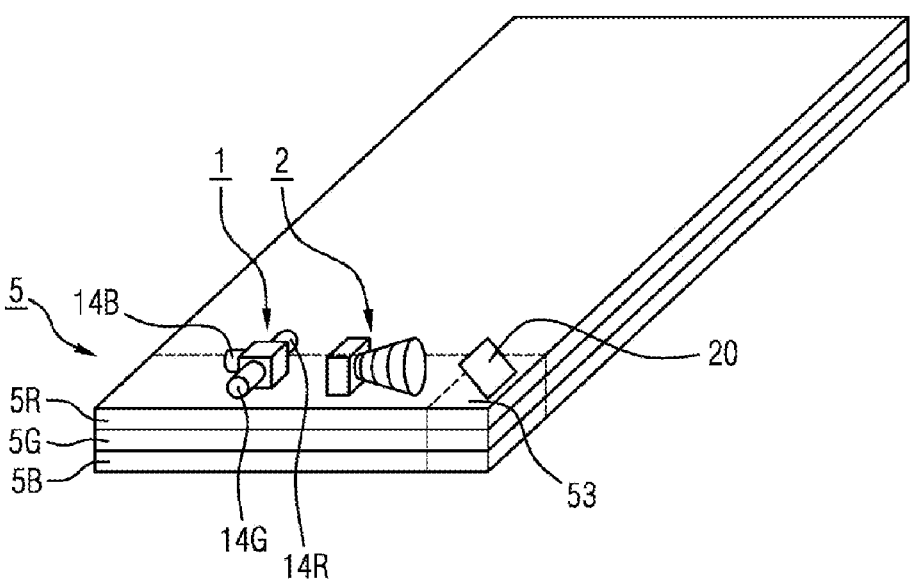
FIG. 3 schematically shows a head-up display with an optical waveguide.

FIG. 3 shows a spatial illustration of a head-up display with three optical waveguides 5R, 5G, 5B, which are arranged one above the other and each stand for an elementary color red, green, and blue. Together they form the optical waveguide 5. The holograms 51, 52, 53 present in the optical waveguide 5 are wavelength-dependent, meaning that one optical waveguide 5R, 5G, 5B is used in each case for one of the elementary colors. An image generator 1 and an optical unit 2 are depicted above the optical waveguide 5. The optical unit 2 has a mirror 20, by means of which the light generated by the image generator 1 and shaped by the optical unit 2 is deflected in the direction of the respective input coupling hologram 53. The image generator 1 has three light sources 14R, 14G, 14B for the three elementary colors. It can be seen that the entire unit shown has a small overall structural height compared to its light-emitting surface.

Figure 4:
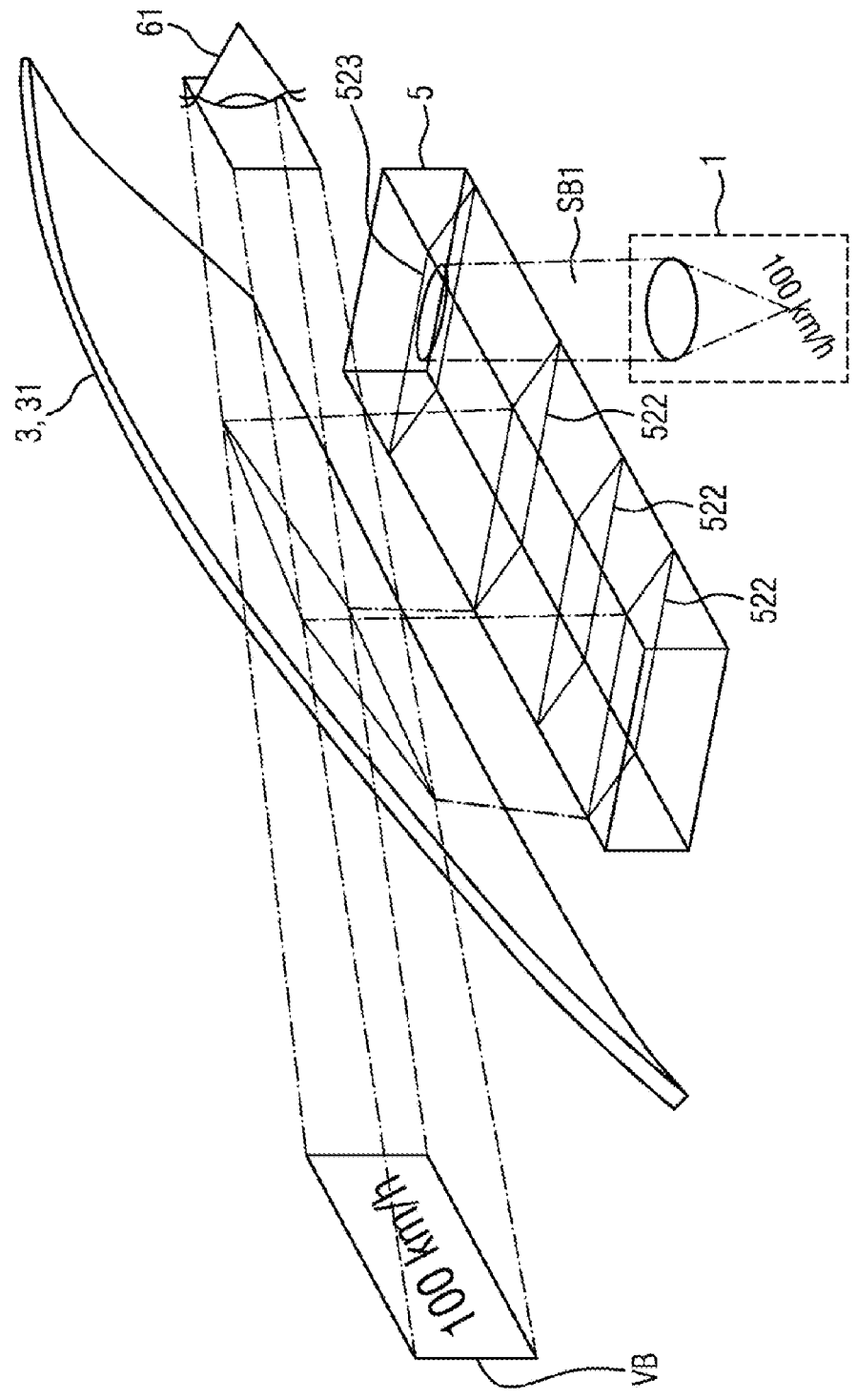
FIG. 4 schematically shows a head-up display with an optical waveguide in a motor vehicle.

FIG. 4 shows a head-up display in a motor vehicle similar to FIG. 1, but here in a spatial illustration and with an optical waveguide 5. It shows the schematically indicated image generator 1, which produces a parallel beam of rays SB1 that is coupled into the optical waveguide 5 by means of the mirror plane 523. The optical unit is not depicted for the sake of simplicity. A plurality of mirror planes 522 each reflect some of the light incident thereon into the direction of the windshield 31, which is to say the mirror unit 3. From here, the light is reflected in the direction of the eye 61. The viewer sees a virtual image VB above the engine hood or at an even farther distance in front of the motor vehicle.

Figure 5:
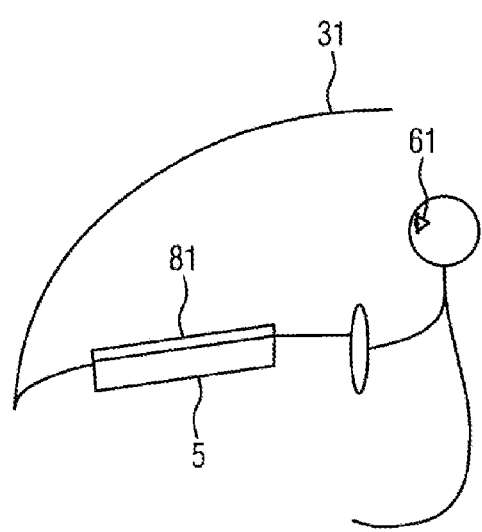
FIG. 5 schematically shows a head-up display with an optical waveguide and antireflection as an antiglare element.

FIG. 5 schematically shows a head-up display with an optical waveguide 5 and antireflection as an antiglare element 81, a windshield 31 and a viewer with an eye 61. The optical waveguide 5 is in this case arranged directly on the antiglare element 81.

Figure 7:
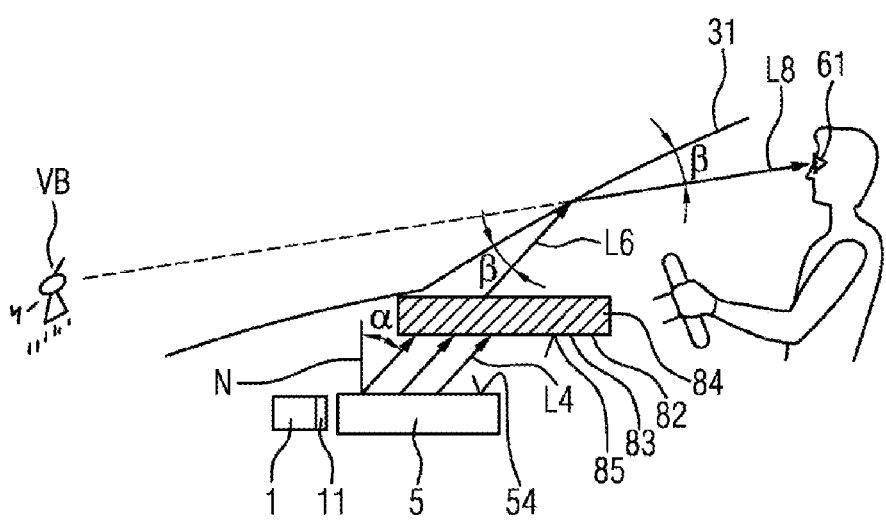
FIG. 7 schematically shows an apparatus according to an embodiment for generating a virtual image.

FIG. 7 shows an apparatus according to the embodiment, in which an optical waveguide 5 is used in a manner corresponding to FIG. 6. It shows the image generator 1 with a display element 11 and an optical waveguide 5, from which light L4 emerges at an angle α with respect to the normal N to the light exit surface 54 of the optical waveguide 5, the angle α being greater than 0°. The emerging light L4 is incident on the light entry surface 85 of a shutter 83, the slats 82 of which are parallel to the emerging light L4 so that it can pass unimpeded through the intermediate spaces 84 between the slats 82. The light L6 emerging from the shutter 83 is incident on the windshield 31 at an angle R and is reflected thereby, and enters the eye 61 of a vehicle occupant, here the driver, as light L8. The driver therefore sees a virtual image VB. In this exemplary embodiment, the shutter 83 forms the cover of the optical unit, and a separate cover element is not provided. The shutter 83 may therefore also come in direct contact with objects or persons located in the interior of the vehicle. Damage to the shutter 83 is therefore not precluded. The shutter 83 is therefore arranged releasably so that, if need be, it is removed without great effort and replaceable with a new or a repaired shutter 83.

Figure 8:
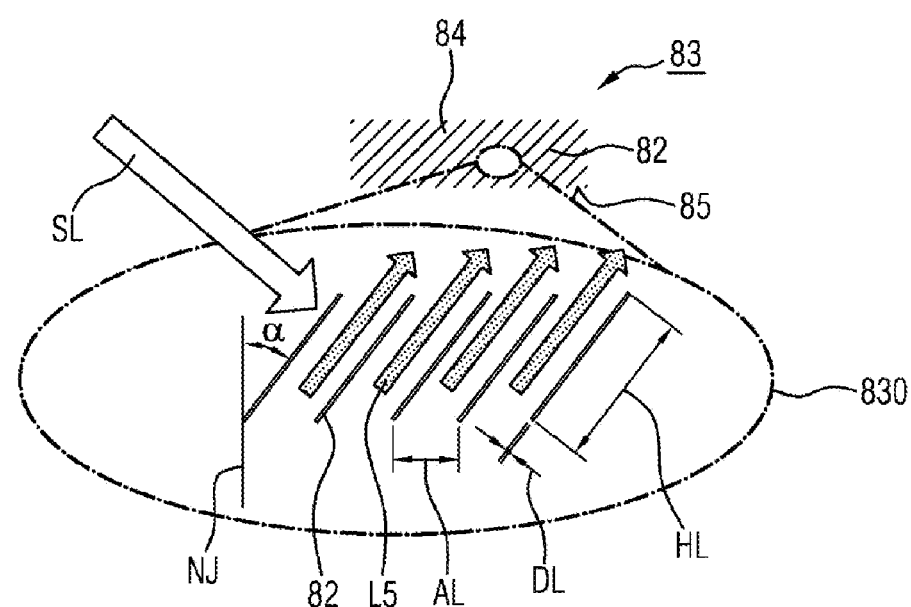
FIG. 8 shows a shutter and a detail enlargement thereof.

FIG. 8 shows the shutter 83 and a detail enlargement 830. It shows the slats 82, which let through the light L5 that emanates from the optical waveguide 5 and travels substantially parallel to the slats 82. Stray light SL that does not travel parallel to the slats 82 is blocked by the slats 82. The slats 82 have a mutual spacing AL and are inclined by an angle α with respect to the normal NJ to the light entry surface 85 of the shutter 83. The slats have a height HL and a thickness DL, wherein the height HL is a multiple of the thickness DL. The angle α corresponds to that of the light emergence from the optical waveguide 5 when the light exit surface 54 of the latter and the light entry surface 85 of the shutter 83 are arranged parallel to one another. In the case of a non-parallel arrangement, these angles are to be converted accordingly. The angle α depends, inter alia, on the position of the driver and their angle of view. For different types of vehicle or different inclinations of the windshield 31, inter alia the spacing AL needs to be adapted. The slats 82 are preferably configured to be non-reflective, that is to say substantially black. If the slats are arranged so as to be tiltable, which is to say the angle α is variably adjustable during operation, they may be set to different positions of the eyebox, or to different positions of the eye 61 inside the eyebox. This assumes that the light coming from the optical waveguide 5 covers a specific angle range so that, for each set angle α, light rays that are aligned parallel to the slats also arrive on the latter and therefore pass through them.

Figure 9:
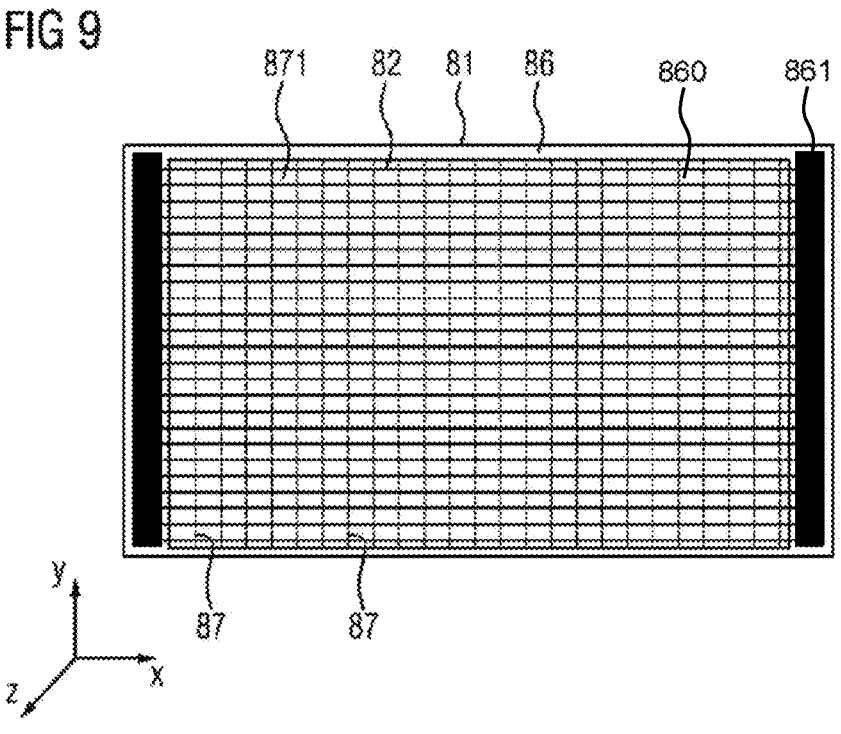
FIG. 9 shows a sectional illustration of the antiglare element in plan view.

FIG. 9 shows a sectional illustration of an antiglare element 81 in a plan view. The slats 82 run parallel to one another through the visible region 860, through which the light L5 coming from the optical waveguide 5 passes through the antiglare element 81. In the x-direction, the slats 82 are fastened at their two ends in a fastening region 861 located outside of the visible region 860. Here, the fastening region 861 is depicted only schematically as a black area; details regarding the fastening of the slats 82 in this region are described hereinbelow.

Figure 10:
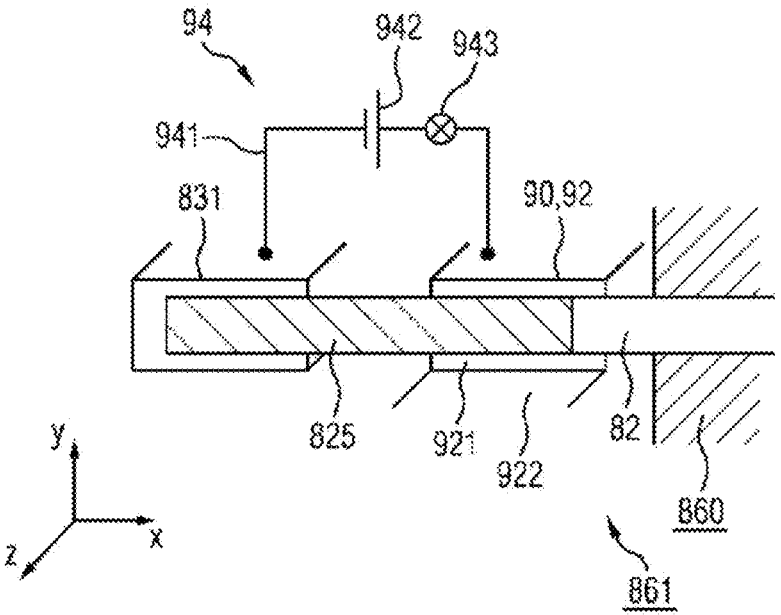
FIG. 10 is a diagram of an apparatus according to an embodiment.

FIG. 10 shows an apparatus according to the embodiment. A slat 82 of the shutter 83 is fastened to pretensioning equipment 831, which serves as a holding mechanism for the slat 82. In the figure, the slat 82 extends to the right, runs along an adjustment mechanism 92 and subsequently enters the visible region 860 of the apparatus from the fastening region 861. On the opposite side, the slat is likewise fastened to a corresponding holding mechanism outside of the visible region 860; this is not depicted here for the sake of clarity. In the exemplary embodiment, the adjustment mechanism 92 also serves as contacting element 90 at the same time. It is in contact with an electrically conductive coating of the slat 82, which, in its slat region 825, is arranged on the side facing away from the viewer and facing a contact surface 921 of the adjustment mechanism. The pretensioning equipment 831 and the adjustment mechanism 92 have an electrically conductive embodiment or are provided with corresponding electrically conductive elements; this is not depicted here for the sake of simplicity. Both are electrically connected to an evaluation circuit 94. This is indicated schematically by means of electrical lines 941, a battery 942 and a lamp 943. For as long as the slat 82 is under mechanical tension, and consequently rests against the contact surface 921, the electrical circuit is closed and the lamp 943 shines. If the slat 82 tears, it loses mechanical tension, no longer rests against the contact surface 921, and the electrical circuit is no longer closed. A lamp 943 that does not shine indicates the detected defect. In the figure, the contact surface 921 is depicted as vertically standing. It is envisaged that it can also be placed at an angle by means of the adjustment mechanism, as a result of which the setting angle of the slat 82 also changes accordingly.

Figure 11:
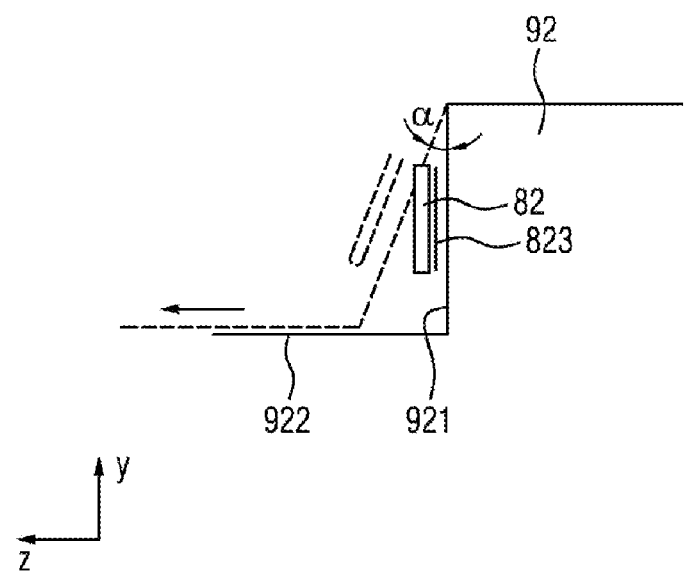
FIG. 11 shows an adjustment mechanism.

FIG. 11 shows an adjustment mechanism 92 in a schematic side view. The contact surface 921, against which the slat 82 rests with the electrically conductive coating 823 that is arranged on its side facing the contact surface 921, is evident. In this illustration, the underside of the contact surface 921 is in contact with a displacement surface 922. The displacement surface 922 can be displaced. A displacement to the left is depicted using dashed lines. In the process, the lower end of the contact surface 921 also moves to the left, while its upper end remains non-displaced. The contact surface 921 now has a tilt through the angle α with respect to the perpendicular. The slat 82 resting thereon in the dashed illustration is likewise tilted through the angle α as a result of resting against the contact surface 921.

Figure 12:
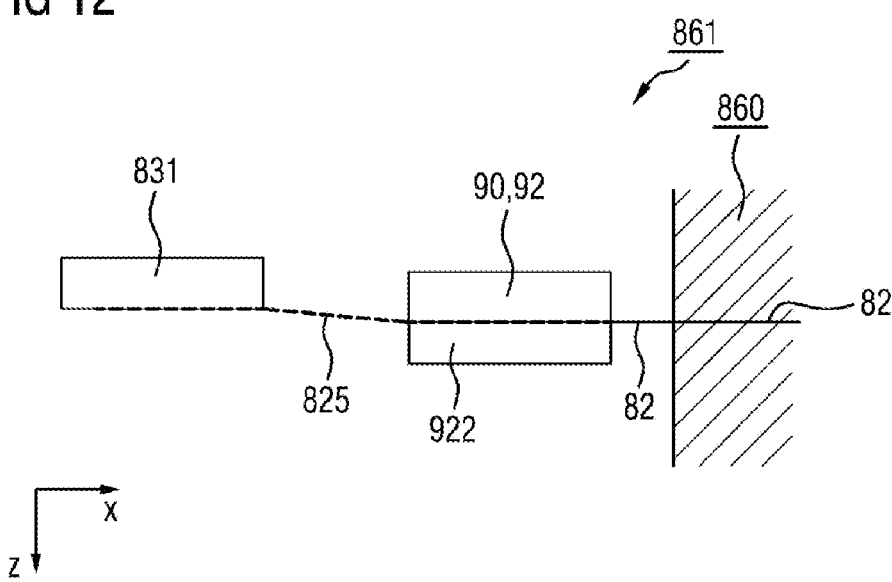
FIG. 12 is a diagram of an apparatus according to an embodiment in plan view.

FIG. 12 shows an apparatus according to the embodiment of FIG. 10 in plan view. It is evident that the tensioning equipment 831 and the adjustment mechanism 92 are arranged slightly offset from one another. The slat 82 consequently has an offset in its slat region 825. In this slat region 825, the electrically conductive coating 823, which is arranged on its side facing the pretensioning equipment 831, is evident.

Figure 13:
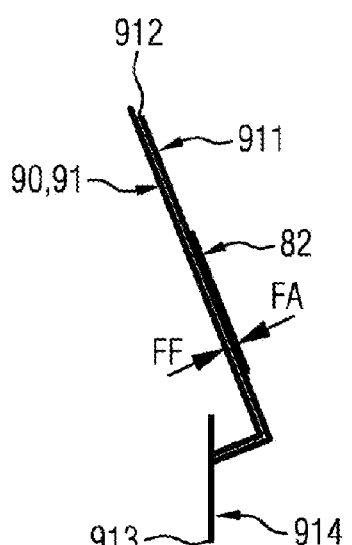
FIG. 13 is a diagram of an apparatus according to an embodiment with a spring.

FIG. 13 shows an apparatus according to the embodiment with a spring 91 as contacting element 90. The spring 91 is provided with an electrically conductive layer 911, which is firstly connected to a first electrical contacting and secondly connected to a second contacting 913 when resting against an electrically conductive stop terminal 914. In this figure, a clamping force FA is applied to the spring 91 by the slat 82 resting thereagainst, the clamping force being greater than the spring force FF, whereby the spring 91 is pressed against the stop terminal 914.

Figure 14:
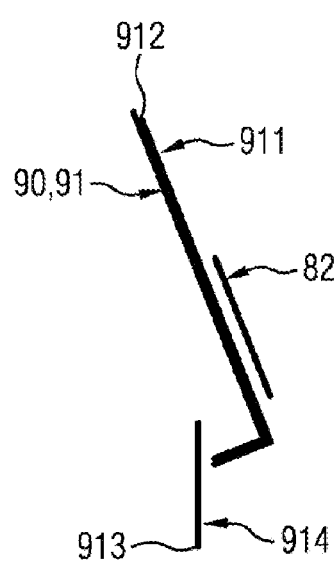
FIG. 14 is a diagram of an apparatus according to an embodiment with a spring.

FIG. 14 shows an apparatus according to the embodiment with a spring 91 from the previous figure, but in this case with a slat 82 that has torn at a location not depicted here, and is consequently no longer under pretension. It therefore no longer rests against the spring 91; the latter is in its relaxed state, in which it is separated from the stop terminal 914. The electrical circuit is consequently open.

According to a first variant, the electrical switch formed by the spring 91 and the stop terminal 914 is arranged between pretensioning equipment 831 and an adjustment mechanism 92. In comparison with the embodiment shown in FIG. 10, the evaluation circuit 94 should then be connected accordingly to the spring 91 and the stop terminal 914; electrical conductivity of the slat 82 is not required in this case. In its slat region 825, the slat 82 rests against the spring 91.

The slat 82 is tensioned by means of the switch in another variant. In this case, the spring 91 serves as pretensioning equipment. Again, the switch closes if the slat 82 tears.

Figure 20:
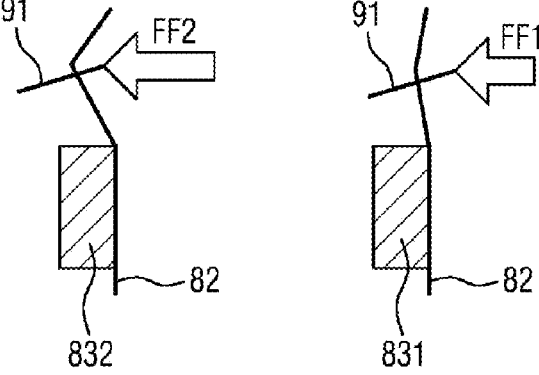
FIG. 20 shows embodiment variants.

FIG. 20 schematically shows these embodiment variants. The slat 82 fastened to the pretensioning equipment 831 is evident in the right-hand part in a plan view, with the slat resting against the spring 91. The spring 91 extends substantially perpendicular to the plane of the drawing, but is indicated here also with its components located above and below the plane of the drawing. The spring exerts a spring force FF1 on the slat 82. The electrical switch is kept open by the tensioned slat 82. The spring 91 is tensioned by way of the slat 82 and the slat 82 is not or virtually not tensioned out of the straight line. The target plan view of the slat 82 is a straight line. If at all, there is only a minimal deflection, as depicted here in exaggerated fashion; by contrast, the deflection is used and forced in the left-hand variant. In the left-hand part of FIG. 20, holding equipment 832 is arranged instead of the above-described pretensioning equipment 831. Pretensioning is implemented by the spring 91, which in this case exerts a greater spring force FF2 on the slat 82, the spring force being indicated by a longer arrow and serving to tension the slat 82. Consequently, the slat 82 is tensioned by means of the switch. Tension is implemented by way of the switch and the slat 82 is deliberately tensioned or pulled out of the straight line as a result. Consequently, the slat 82 is not a straight line in the target plan view.

Figure 21:
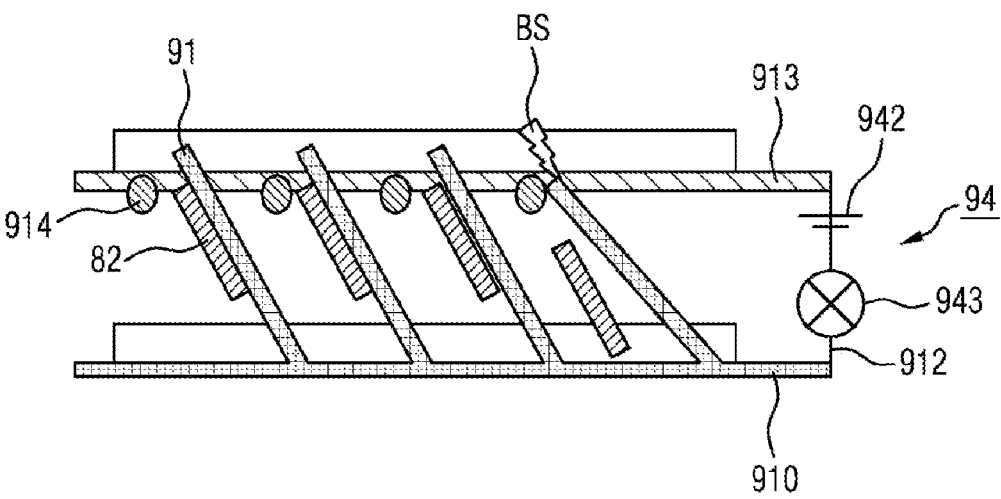
FIG. 21 shows a further embodiment variant.

FIG. 21 shows a further embodiment in a schematic illustration. The slats 82 and the springs 91 resting thereon are evident. The springs 91 preferably consist of metal and are connected to a common base 910. The base 910 is connected to an evaluation circuit 94. Stop terminals 914 are connected to a joint contacting 913 of the evaluation circuit. The three slats 82 depicted to the left are intact; they oppose the corresponding springs 91 with a force sufficient to keep the respective spring 91 away from the associated stop terminal 914. The switches formed by the respective spring 91 and associated stop terminal 914 are consequently open. The right-hand slat 82 is defective; it cannot oppose the corresponding spring 91 with sufficient force, and so said spring comes to rest at the associated stop terminal 914 and closes the electrical circuit. This is indicated by means of a stylized flash BS.

Figure 15:
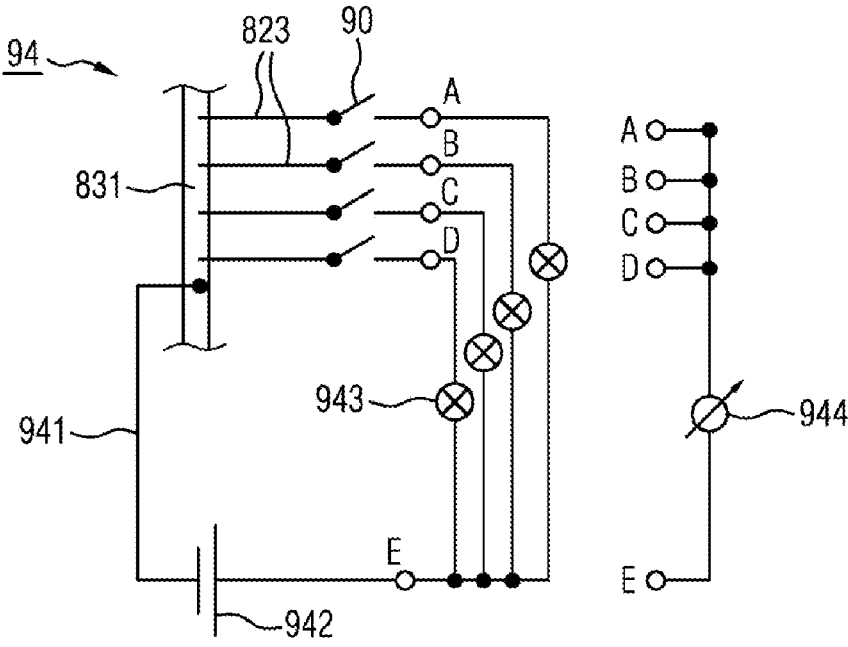
FIG. 15 shows an electrical evaluation circuit.

FIG. 15 schematically shows an electrical evaluation circuit 94 in two variants. A battery 942 is electrically connected to the pretensioning equipment 831 by means of an electrical line 941. The pretensioning equipment 831 itself is electrically conductive or has electrical connections to the slats 82 and the electrically conductive coating 823 thereof. The coatings 823 of four slats 82, not depicted in themselves here, are shown schematically here. The corresponding contacting elements 90 are depicted as electrical switches. In the first variant, each of the contacting elements 90 is connected to a lamp 943. It is consequently possible to detect a defect in each individual slat. The right-hand part of the figure shows an alternative variant, in which all contacting elements 90 are connected to single measurement apparatus 944. If one or more of the contacting elements 90 is open because the corresponding slat 82 has been torn, then there is a change in the current flow through the measurement apparatus 944 and a defect is detected. Even if this variant does not detect the specific slat 82 that has been torn, the defect detection nevertheless serves to optionally replace the entire shutter 83 for one with intact slats 82.

In other words, aspects of the embodiments relate to the following: Antireflection is carried out in head-up displays by means of a so-called glare trap as an antiglare element 81 with a curved film. This design entails a minimum installation depth corresponding to the foil curvature. Antireflection of head up-displays which use the windshield 31 as a mirror element, or projection surface, is carried out by means of slats 82 or a grid structure as a terminating module; see for example FIG. 5. Particularly for head-up displays with optical waveguides 5 in flat fitting, an antireflection solution is needed since flat glass components directly under the windshield 31 are particularly susceptible to perturbing reflections. This solution is preferably angle-adjustable in order to reduce shading in the eyebox.62. Slats 82 are preferably provided for the antireflection. Such a solution requires a slat tear detection in order to protect the driver from reflections.

Possible damage to one or more slats 82 must be detected by the vehicle both before and during the trip for safety reasons, and must be reported to the driver for their protection against possible reflections. There has hitherto been no reliable solution to detect a slat tear. The slats 82 are installed directly behind the windshield 31, and so large thermal stresses may occur here as well, for example due to sunlight. The assembly with the slats 82 is within reach of the driver and is moreover exposed to cleaning scenarios. Consequently, damage to the slats, which may lead to slats tearing off, cannot be precluded with sufficient reliability. Detection and warning is therefore required for safety reasons.

According to at least one aspect of an embodiment, slats 82 are each fastened by holding mechanisms such as the pretensioning equipment 831 and tensioned between the holding mechanisms. Adjustment mechanisms 92 are used between the holding mechanisms in order to ensure the angle adjustability of the slats 82.

In an embodiment, for example the pretensioning equipment 7, 7' described in the following figures can be used as holding mechanisms. This embodiment unifies the holding of the slats 82, the pretensioning of the slats 82 and the adjustment of the setting angle α of the slats 82 in one component. For defect detection, the embodiment described hereinabove of the contacting element 90 as a spring 91 is advantageous here.

Figure 16:
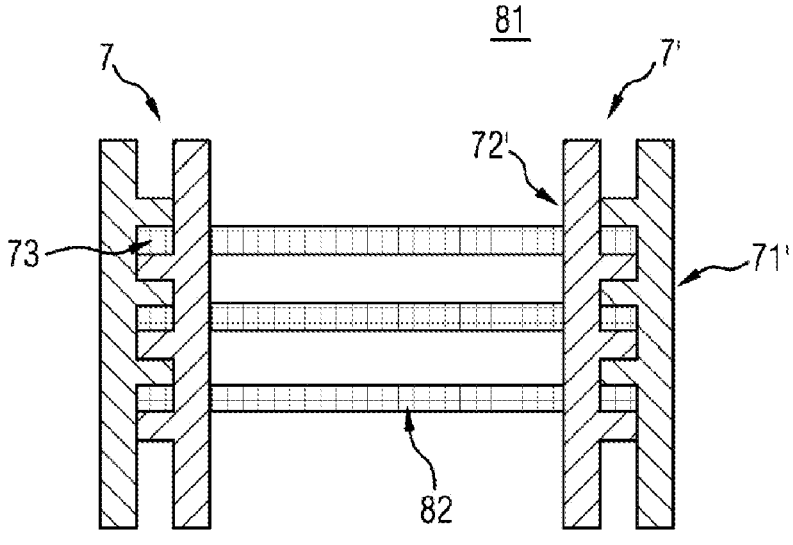
FIG. 16 shows an antiglare element in plan view.
Figure 16:
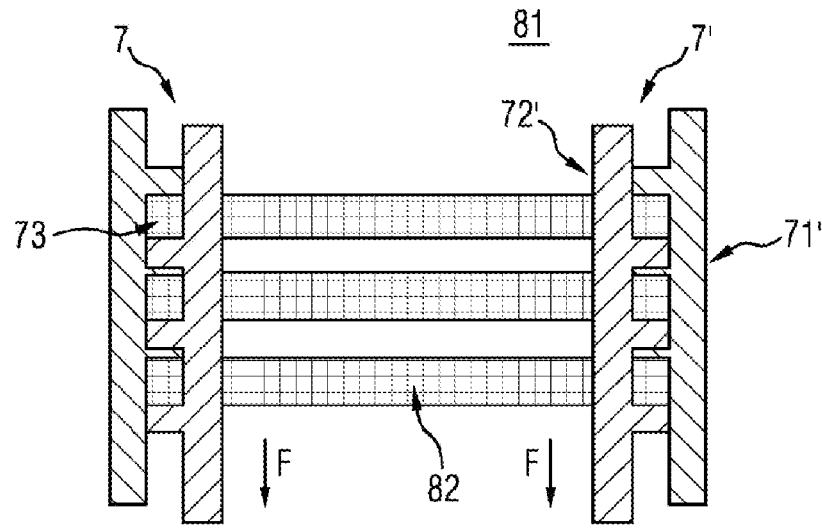

FIG. 16 shows an antiglare element 81 in a plan view, in the lower part of the figure with a force being exerted and in the upper part of the figure without a force being exerted. The antiglare element 81 has pretensioning equipment 7 in the form of a spring on the left and corresponding pretensioning equipment 7' on the right. These have first planes 71, 71' and second planes 72, 72'. Slats 82 are tensioned between the pieces of pretensioning equipment 7, 7'. In the embodiment shown, the slats 82 are fastened at their ends to transition slants 73, which are therefore not visible in the figure. It is evident in the upper region of the figure that the planes 71, 71' and 72, 72' are not displaced relative to one another. In the lower region of the figure, a force F acts on the planes 72, 72', as a result of which they are displaced in relation to the first planes 71, 71'. The transition slants 73 change their angle and thus do the slats 82.

Figure 17:
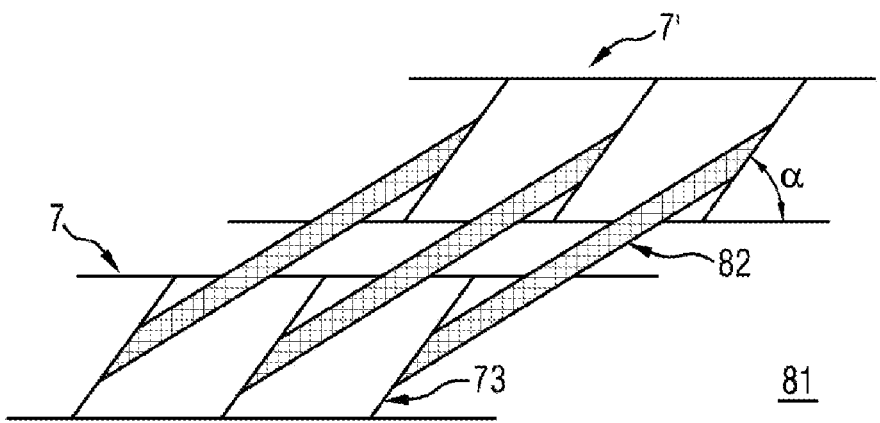
FIG. 17 shows an antiglare element.

FIG. 17 shows a schematic spatial view of an antiglare element 81 shown in the previous figure. Two pieces of pretensioning equipment 7, 7', stylized only by lines, can be seen with their transition slants 73, to which the slats 82 are fastened. The setting angle α is also shown.

Figure 18:
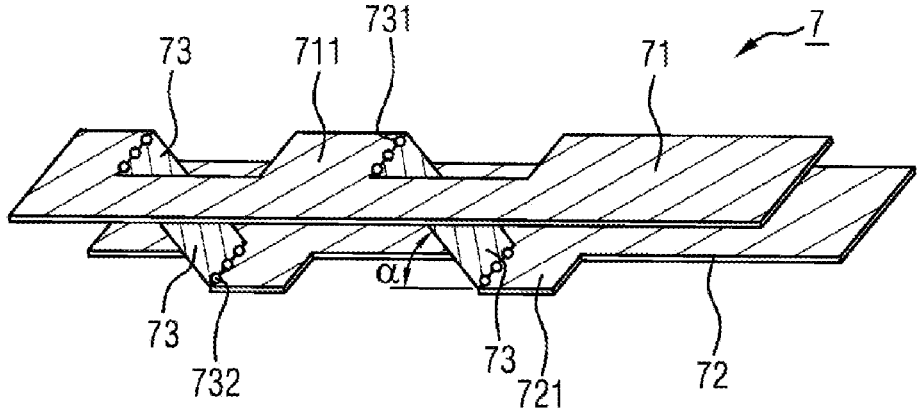
FIG. 18 shows a schematic spatial illustration of pretensioning equipment.

FIG. 18 shows a schematic spatial illustration of pretensioning equipment 7 as shown in the two previous figures in its three-dimensional form. The spatially separated planes 71, 72 are evident. The first plane 71 is located above the second plane 72. The transition slants 73 run at an angle from top left to bottom right. They are connected at the top to bars 711, at their lower ends to bars 721. There is a perforation 731, 732 in the transition region between bar 711, 721 and transition region 73. If the upper plane 71 is displaced to the left by the exertion of a force, the setting angle α becomes smaller, the inclination of the transition slant 73 is less pronounced and thus so is the inclination of the respective slat (not shown here) in contact with it. If the upper plane 71 is displaced to the right by the exertion of a force, the setting angle α becomes larger, the transition slants 73 are steeper and thus so are the corresponding slats. The one-piece design of the spring 7 ensures that the transition slants 73 are always parallel to one another in this case, which is to say have the same setting angle α.

According to an embodiment, an electrically conductive coating 823 is applied only to the back side of the slat 82, which is to say to the side thereof facing the adjustment mechanism 92. Consequently, the coating 823 is situated outside of the visible region 860 of the apparatus in the form of a waveguide head-up display in particular. This ensures an electrically conductive connection between the pretensioning equipment 831, 7 as a holding mechanism and the contacting element 90 in the form of an adjustment mechanism 92 or spring 91. This electrically conductive connection can be verified on the part of the vehicle. Depending on the evaluation circuit 94 employed, there is monitoring of the slats 82 for a slat tear on an individual basis or in packets. Either a tear or a proportional change of the resistance is detected.

In the case of a slat tear, there is a loss of contact between the slat 82 and the contacting element 90, the latter for example in the form of a spring 91 or adjustment mechanism 92. The loss of contact can be forced by slight displacement of the holding mechanism, for example the pretensioning equipment 831, 7, toward the contacting element 90, for example the spring 91 or adjustment mechanism 92. To validate the loss of contact in the case of a slat tear, the geometric properties can be adapted, for example by suitably arranged beads.

In a further embodiment variant, both the holding mechanism and the contacting element 90, which is to say the spring 91 or adjustment mechanism 92, may have a party insulating embodiment. By way of example, this can be obtained by applying a layer with an insulating effect in combination with partial damaging of the insulating coating.

Figure 19:
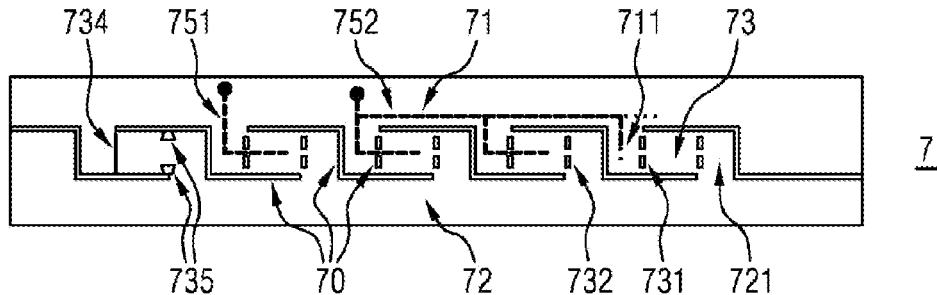
FIG. 19 shows pretensioning equipment in the form of the spring.

By way of example, as described in relation to FIG. 19, the electrical contacting in the holding mechanism can be implemented by the use of a partially applied electrically conductive adhesive 751, 752. A corresponding adhesive may also be advantageously provided for the contacting element 90.

FIG. 19 shows pretensioning equipment 7 in the form of a spring in plan view. The pretensioning equipment 7 is shown here in its two-dimensional form, which it has before it is brought into its three-dimensional form during manufacturing. The figure shows the first plane 71 and the second plane 72, which in the two-dimensional form are both still in the same plane, here the plane of the drawing. Bars 711 extend from the first plane 71 in the direction of the second plane 72. Bars 721 extend from the second plane 72 in the direction of the first plane 71. Transition slants 73 connect in each case one bar 711 to a bar 721. A perforation 731 is arranged at the transition between a bar 711 of the first plane 71 and the transition slant 73. A perforation 732 is arranged at the transition between a bar 721 of the second plane 72 and the transition slant 73. A kink forms at this perforation 731, 732 when the spring 7 is moved from its illustrated two-dimensional form to its three-dimensional form. The transition slant 73 is then at an angle to the planes 71, 72 and forms a substantially planar surface between the perforations 731, 732. To produce the spring of the pretensioning equipment 7, a thin, rectangular metal sheet or a corresponding foil is preferably used, which is cut, punched or processed in some other suitable manner using a cutting contour 70. In the left part of the figure, a groove 734 is shown as an example, which is provided either instead of the perforation 731 or in addition to it. Peripheral cutouts 735 are likewise shown, as an alternative to the perforation 731. It goes without saying that normally only either perforations 731 or grooves 734 or peripheral cutouts 735 are provided in pretension equipment 7. However, a combination of two or three of these elements can also be a useful configuration.

Two variants of a partially applied electrically conductive adhesive 751, 752 are shown in exemplary fashion. In one first variant, one strip of electrically conductive adhesive 751 is applied in each case to each transition slant 73, with these strips extending from the transition slant 73 into the region of the first plane 71. Then, the adhesive 751 is in electrical contact with a slat 82, not depicted here, in the region of the transition slant 73 and in contact with a contacting, not depicted here, in the region of the plane 71. Advantageously, the slat 82 and/or the contacting are fastened to the pretensioning equipment 7 by means of the adhesive. The adhesive 751 can both be applied to the two-dimensional form of the pretensioning equipment 7, depicted here, which is to say before the latter is folded into three dimensions, and subsequently connected to the slat 82 or contacting. Once the adhesive 751 has cured, the conductor track formed thereby, which connects the slat 82 to the contacting, has also cured, and unwanted adhesive bonding to other components is then precluded. In addition, the electrically conductive adhesive 751 can be applied only just before the attachment of the slat 82 and/or the contacting. This is advantageous in that a quick-drying adhesive can be used as adhesive 751, and in that the handling during the assembly is not made more complicated by unwanted adhesion of the already applied but not yet cured adhesive. In a second variant, a strip of electrically conductive adhesive 752 is provided, the strip extending over a relatively long portion of the first plane 71 and having multiple branches, which each end at a transition slant 73. This enables detection of a slat tear for a plurality of slats 82 in a package.

The slat upper side is precluded from contacting a subsequently arranged element of the adjustment mechanism 92 as a result of the one-sided coating of the slat 82 with an electrically conductive coating 823.

A variant provides for the slat 82 to press down on a spring 91 in the assembled state and ensure the contacting of a stop terminal 914 with the spring 91 as a result of the contact pressure. Consequently, the springs 91 are not securely connected to the stop terminal 914. In the case of a possible slat tear, the spring 91 returns to its non-tensioned initial position as a result of the lack of contact pressure. Spring 91 and stop terminal 911 are no longer in contact.

A further variant provides for the switch, for example realized by means of the spring 91, to close in the absence of the pretension of the slat 82 in the case of a slat tear and be opened by the slat tension. The contact closes as soon as a slat 82 tears, and the result is detected.

The required conductive coating 823 of the slats 82 is applied outside of the visible region 860 of the antiglare element 81. Hence, the coating 823 need not satisfy any special optical properties. Consequently, required properties for avoiding glare and for increasing the conductivity, including the stability of the conductivity over different temperature ranges, are spatially separated.

In the case of a slat tear, the slat 82 loses contact with the contacting element 90, for example the spring 91 or the adjustment mechanism 92. Consequently, it is possible to detect an unambiguous digital on/off signal, and not a possibly ambiguous change in a signal like in other solutions.

The relevant electrical resistance of the slat region 825 is small and significantly smaller than the resistance of an overall slat over the entire length without additional coating for increasing the conductivity. A further advantage of the variant in which an electrically conductive coating 823 is arranged in the slat region 825, which is to say outside of the visible region 860, lies in the fact that temperature changes caused by insolation which may have an effect on the electrical conductivity, or other changes in the conductivity caused by light, have no influence or only little influence on the electrical conductivity of an electrical conductor arranged exclusively in the fastening region 861, independently of whether said conductor is an electrically conductive coating 823, electrically conductive material of the slat 82, or a different type of electrical conductor.

Aspects of the embodiments may also be employed in conventional head-up displays (for example based on mirrors). Here, the antiglare element 81 is preferably used as a terminating module. Aspects of the embodiments may also be used as adjustable antireflection inside assemblies. The antiglare element 81 is then integrated into the module. Aspects of the embodiments may also be used as visual protection for displays (privacy filter) as an adaptive solution. Aspects of the embodiments may also be used as visual protection for windows/domelight windows (smartwindows) for brightness setting. Aspects of the embodiments may also be usable for military applications (reflection reduction for telescopic sights) or for reflection reduction for cameras and surveillance cameras.

The invention claimed is:

1. An apparatus for generating a virtual image, having:
a display element configured to generate an image;
an optical waveguide configured to expand an exit pupil; and
an antiglare element arranged after the optical waveguide in a beam path, the antiglare element configured as a shutter comprising slats,
wherein the slats are braced in pretensioning equipment outside of a visible region of the apparatus, and rest against a contacting element under mechanically induced pretension, and
wherein the contacting element is connected to an evaluation circuit configured to detect a defect of a slat.

2. The apparatus as claimed in claim 1, wherein the contacting element is an adjustment mechanism for changing a setting angle of the slats.

3. The apparatus as claimed in claim 1, wherein an electrical evaluation circuit is provided, by which a plurality of the slats are jointly monitored.

4. The apparatus as claimed in claim 3, wherein the pretensioning equipment and/or the contacting element is provided with an electrically conductive adhesive.

5. The apparatus as claimed in claim 1, wherein the pretensioning equipment and the contacting element are arranged offset one another in a direction perpendicular to a longest extent of a slat.

6. An apparatus for generating a virtual image, having:
a display element configured to generate an image;
an optical waveguide configured to expand an exit pupil; and
an antiglare element arranged after the optical waveguide in a beam path, the antiglare element configured as a shutter comprising slats,
wherein the slats are braced in pretensioning equipment outside of a visible region of the apparatus, and rest against a contacting element under pretension,
wherein the contacting element is connected to an evaluation circuit configured to detect a defect of a slat, and
wherein the contacting element is a spring with an electrically conductive embodiment, which is electrically connected to a stop terminal in a tensioned state or in a rest state and which is electrically separated from the stop terminal in the corresponding other state.

7. The apparatus as claimed in claim 6, wherein the slat has the electrically conductive embodiment at least in a slat region situated outside of the visible region of the apparatus.

8. The apparatus as claimed in claim 7, wherein the slat has an electrically insulating embodiment on its side facing away from the contacting element.

9. The apparatus as claimed in claim 8, wherein the pretensioning equipment and the contacting element are arranged offset in a direction perpendicular to a longest extent of a slat.

10. The apparatus as claimed in claim 9, wherein the contacting element is an adjustment mechanism for changing a setting angle of the slats.

11. The apparatus as claimed in claim 10, wherein an electrical evaluation circuit is provided, by which a plurality of the slats are jointly monitored.

12. The apparatus as claimed in claim 11, wherein the pretensioning equipment and/or the contacting element is provided with an electrically conductive adhesive.

* * * * *